(12) United States Patent
Yang

(10) Patent No.: US 6,855,663 B1
(45) Date of Patent: Feb. 15, 2005

(54) METHODS FOR PRODUCING A CATALYST FOR ETHYLENE HOMO- AND CO-POLYMERIZATION

(75) Inventor: Chun Byung Yang, Taejeon (KR)

(73) Assignee: Samsung General Chemicals Co., Ltd., Chungnam Province (KR)

( * ) Notice: Subject to any disclaimer, the term of this patent is extended or adjusted under 35 U.S.C. 154(b) by 0 days.

(21) Appl. No.: 09/980,168

(22) PCT Filed: Oct. 23, 1999

(86) PCT No.: PCT/KR99/00639

§ 371 (c)(1),
(2), (4) Date: Apr. 26, 2002

(87) PCT Pub. No.: WO00/73356

PCT Pub. Date: Dec. 7, 2000

(30) Foreign Application Priority Data

May 27, 1999 (KR) .................................. 1999/19192

(51) Int. Cl.$^7$ .................... B01J 21/08; B01J 21/12; B01J 21/14; B01J 23/00; B01J 20/10
(52) U.S. Cl. ............... 502/242; 502/251; 502/351; 502/407
(58) Field of Search ............... 502/242, 251, 502/340, 350, 407

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scatá et al. |
| 4,226,963 A | 10/1980 | Giannini et al. |
| 4,263,169 A | 4/1981 | Scata et al. |
| 4,277,372 A | 7/1981 | Matlack |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A * | 6/1983 | Imai et al. ................... 526/125 |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A * | 6/1987 | Kioka et al. ................. 526/125 |
| 4,729,854 A | 3/1988 | Miyata et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |

(List continued on next page.)

FOREIGN PATENT DOCUMENTS

| | | |
|---|---|---|
| DE | 2 153 520 | 5/1972 |
| DE | 3636060 | 5/1988 |
| EP | 0 131 832 | 1/1985 |

(List continued on next page.)

OTHER PUBLICATIONS

Averbuj et al. "Stereoregular polymerization of α–olefins catalyzed by chiral group 4 benzamidinate complexes of $C_1$ and $C_3$ symmetry", Journal of the American Chemical Society, 1998, vol. 120, pp. 8640–8646.

(List continued on next page.)

Primary Examiner—Cam N. Nguyen
(74) Attorney, Agent, or Firm—Meyertons, Hood, Kivlin, Kowert & Goetzel P.C.; Eric B. Meyertons

(57) ABSTRACT

The present invention relates to a catalyst for homo-polymerization or co-polymerization of ethylene, or more particularly to a solid complex titanium catalyst for homo-polymerization or co-polymerization of ethylene. The catalyst may be produced by preparing a magnesium solution by contact-reacting a magnesium halide compound with alcohol. Reacting the solution with an ester compoound and a silicon compound. Then reacting the solution with a mixture of a titanium compound and a silicon compound.

23 Claims, No Drawings

U.S. PATENT DOCUMENTS

| | | | |
|---|---|---|---|
| 4,970,186 | A | 11/1990 | Terano et al. |
| 4,978,648 | A | 12/1990 | Barbé et al. |
| 4,988,656 | A | 1/1991 | Arzoumanidis et al. |
| 4,990,479 | A | 2/1991 | Ishimaru et al. |
| 5,006,499 | A | 4/1991 | Daire |
| 5,013,702 | A | 5/1991 | Arzoumanidis et al. |
| 5,021,382 | A | 6/1991 | Malpass, Jr. |
| 5,059,570 | A | 10/1991 | Bailly et al. |
| 5,061,667 | A | 10/1991 | Murata et al. |
| 5,064,798 | A | 11/1991 | Chang |
| 5,081,090 | A | 1/1992 | Arzoumanidis et al. |
| 5,104,838 | A | 4/1992 | Fujita et al. |
| 5,106,807 | A | 4/1992 | Morini et al. |
| 5,124,297 | A | 6/1992 | Arzoumanidis et al. |
| 5,130,284 | A | 7/1992 | Terano et al. |
| 5,134,104 | A | 7/1992 | Sasaki et al. |
| 5,175,332 | A | 12/1992 | Chatterton et al. |
| 5,182,245 | A | 1/1993 | Arzoumanidis et al. |
| 5,218,052 | A | 6/1993 | Cohen et al. |
| 5,244,996 | A | 9/1993 | Kawasaki et al. |
| 5,346,872 | A | 9/1994 | Menon et al. |
| 5,419,116 | A | 5/1995 | Rast et al. |
| 5,438,110 | A | 8/1995 | Ishimaru et al. |
| 5,439,995 | A | 8/1995 | Bailly et al. |
| 5,455,316 | A | 10/1995 | Tsutsui et al. |
| 5,459,116 | A | 10/1995 | Ro et al. |
| 5,498,770 | A * | 3/1996 | Hosaka et al. ............... 502/116 |
| 5,502,128 | A | 3/1996 | Flores et al. |
| 5,585,317 | A | 12/1996 | Sacchetti et al. |
| 5,587,436 | A | 12/1996 | Klimek et al. |
| 5,587,440 | A | 12/1996 | Ehlers et al. |
| 5,618,886 | A | 4/1997 | Shinozaki et al. |
| 5,629,390 | A | 5/1997 | Nishimura et al. |
| 5,643,845 | A | 7/1997 | Tajima et al. |
| 5,696,044 | A | 12/1997 | Zakharov et al. |
| 5,726,261 | A | 3/1998 | Sacchetti et al. |
| 5,780,378 | A | 7/1998 | Toida et al. |
| 5,798,424 | A | 8/1998 | Kong et al. |
| 5,817,591 | A | 10/1998 | Shamshoum et al. |
| 5,844,046 | A | 12/1998 | Ohgizawa et al. |
| 5,849,654 | A | 12/1998 | Fushimi et al. |
| 5,849,655 | A | 12/1998 | Shamshoum et al. |
| 5,869,418 | A | 2/1999 | Iiskola et al. |
| 5,877,265 | A * | 3/1999 | Toida et al. ............... 526/125.3 |
| 5,880,056 | A | 3/1999 | Tsutsui et al. |
| 5,936,049 | A * | 8/1999 | Kojoh et al. ............... 526/114 |
| 5,948,872 | A | 9/1999 | Kioka et al. |
| 5,965,478 | A | 10/1999 | Goto et al. |
| 5,968,862 | A | 10/1999 | Abbott et al. |
| 6,028,149 | A | 2/2000 | Luciani et al. |
| 6,034,025 | A | 3/2000 | Yang et al. |
| 6,066,702 | A | 5/2000 | Ro et al. |
| 6,111,038 | A * | 8/2000 | Kioka et al. ............... 526/123.1 |
| 6,114,276 | A | 9/2000 | Kong et al. |
| 6,214,759 | B1 | 4/2001 | Chang et al. |
| 6,218,331 | B1 | 4/2001 | DiMaio et al. |
| 6,235,854 | B1 * | 5/2001 | Kioka et al. ............... 526/119 |
| 6,291,385 | B1 | 9/2001 | Lee et al. |
| 6,323,150 | B1 * | 11/2001 | Kojoh et al. ............... 502/125 |
| 6,521,560 | B1 * | 2/2003 | Kojoh et al. ............... 502/104 |
| 6,537,942 | B2 * | 3/2003 | Shinozaki et al. ............... 502/125 |
| 6,559,250 | B2 | 5/2003 | Ro et al. |
| 2001/0031694 | A1 | 10/2001 | Yang et al. |
| 2002/0037980 | A1 | 3/2002 | Yang et al. |
| 2002/0045537 | A1 | 4/2002 | Yang et al. |
| 2002/0120079 | A1 | 8/2002 | Ro et al. |

FOREIGN PATENT DOCUMENTS

| | | |
|---|---|---|
| EP | 131832 | 5/1987 |
| EP | 0 385 765 | 9/1990 |
| EP | 0 350 170 | 3/1994 |
| EP | 0 607 703 | 7/1994 |
| EP | 0 669 347 | 8/1995 |
| EP | 0 606 125 | 5/1997 |
| EP | 0 602 922 | 1/1998 |
| EP | 0 391 336 | 10/1999 |
| GB | 1335887 | 10/1973 |
| GB | 1492618 | 11/1977 |
| GB | 1577643 | 10/1980 |
| JP | 51136625 | 11/1976 |
| JP | 52-111528 | 9/1977 |
| JP | 52111528 | 9/1977 |
| JP | 58083006 | 5/1983 |
| JP | 59-145206 | 8/1984 |
| JP | 61-055103 | 3/1986 |
| JP | 61-268704 | 11/1986 |
| JP | 62-081405 | 4/1987 |
| JP | 63054004 | 3/1988 |
| JP | 63191811 | 8/1988 |
| JP | 63-199703 | 8/1988 |
| JP | 63-308003 | 12/1988 |
| JP | 1242605 | 9/1989 |
| JP | 2240145 | 9/1990 |
| JP | 06-340711 | 12/1994 |
| JP | 09-176226 | 7/1995 |
| JP | 7242706 | 9/1995 |
| JP | 8109215 | 4/1996 |
| JP | 9165478 | 6/1997 |
| JP | 2000191845 | 7/2000 |
| KR | 9202488 | 1/1990 |
| KR | 9300665 | 9/1990 |
| WO | 0132718 | 5/2001 |

OTHER PUBLICATIONS

Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624.

Edelmann, "N–silylated benzamidines: versatile building blocks in main group and coordination chemistry," Coordination Chemistry Reviews, vol. 137, 1994, pp. 403–481.

Zhou et al., "Synthesis and Structure of Novel Bridged Dinuclear Indium Complexes," Inorg. Chem., 1996, vol. 35, pp. 1423–1424.

Zhou et al., "Bulky Amidinate Complexes of Tin(IV). Synthesis and Structure of Sn(RNC(R')NR)$_2$C2$_2$ (R=Cyclohexyl, R'=H, Me; R=SiMe$_3$, R'=$^t$Bu)," Inorg. Chem., 1997, vol. 36, pp. 501–504.

Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. AM. Chem. Soc., 1995, vol. 117, pp. 3008–3021.

Stokes et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.

* cited by examiner

METHODS FOR PRODUCING A CATALYST FOR ETHYLENE HOMO- AND CO-POLYMERIZATION

BACKGROUND OF THE INVENTION

1. Field of the Invention

The present invention relates to a catalyst for homo-polymerization or co-polymerization of ethylene, or more particularly to a high-activity titanium solid complex catalyst supported in a carrier containing magnesium the catalyst showing high catalytic activity high bulk density, and high hydrogen sensitivity.

2. Description of the Related Art

Catalysts containing magnesium for polymerization or co-polymerization of ethylene arc known to have very high catalytic activities and to accord good bulk density which are in turn suitable for liquid phase or gas phase polymerization. By liquid phase polymerization of ethylene, it denotes the polymerization process performed in such medium of bulk ethylene isopentane or hexane, and as for the important characteristics in consideration of the applicability of the catalyst used in this process they are as follows: high activity, bulk density the amount of molecules of low molecular weight dissolved in a medium etc. Furthermore, in most of these manufacturing processes, hydrogen is used to control the molecular weight. The changes in the molecular weight (hereinafter hydrogen sensitivity) according to the amount of hydrogen is another characteristic of a catalyst which is different per catalyst. The catalyst with high hydrogen sensitivity can control the molecular weight by using less amount of hydrogen at the time of the application of the process. As such, it provides more leeway with respect to the operation of the process.

Many of the titanium-based catalysts containing magnesium for olefin polymerization, and the manufacturing methods thereof have been reported. Especially many processes making use of magnesium solutions to obtain olefin polymerization catalysts of good bulk density have been known. There is a means of obtaining a magnesium solution by reacting magnesium compounds with such electron donors as alcohol amine cyclic ether or organic carboxylic acid in the presence of a hydrocarbon solvent. As for the cases of use of alcohol, they are disclosed in U.S. Pat. Nos. 4,330, 649, and 5,106,807. Further the methods for production of catalysts containing magnesium by reacting a liquid magnesium solution with a halide compound such as titanium tetrachloride are well known. Such catalysts provide good bulk density, but there is much yet to be improved with respect to their catalytic activities and hydrogen sensitivity. In U.S. Pat. Nos. 4,477,639 and 4,518,706, a cyclic ether tetrahydrofurane was used as a solvent of the magnesium compound.

U.S. Pat. Nos. 4,847,227, 4,816,433, 4,829,037, 4,970, 186, and 5,130,284 claimed the methods of producing olefin polymerization catalysts of good bulk density with superior polymerization activity due to the reaction of a titanium chloride compound with an electron donor compound such as magnesium alkoxide, dialkyl phthalate and phthaloyl chloride.

U.S. Pat. No. 5,459,116 reports the method of producing supported titanium solid catalysts by means of contact-reacting a titanium compound and a magnesium solution containing an ester having at least one hydroxy group as an electron donor. By using this method, it is possible to obtain a catalyst of superior polymerization activity and bulk density. However, there remain things to be improved with respect to hydrogen sensitivity.

U.S. Pat. No. 5,869,418 shows the method of increasing hydrogen sensitivity by using a dialkoxyphenylalkane in the propylene polymerization as an external electron donor, and the advantages of such method. However, the above effects were obtained by using the external electron donor in addition to the solid catalyst, and also it is limited to polymerization and co-polymerization of propylene.

SUMMARY OF THE INVENTION

As shown above, there is a need for the development of a new catalyst for homo-polymerization or co-polymerization of ethylene for producing polymers with the following conditions: simple manufacturing process, high polymerization activity, high bulk density for polymers by means of controlling the catalyst particles, and high hydrogen sensitivity. In the present invention, therefore, it is intended to provide a method for producing, from low-cost compounds via a simple process, a catalyst having an excellent catalytic activity, and superior hydrogen sensitivity, capable of producing polymers of good bulk density. Further, the specific production process of catalysts and the steps thereof as disclosed in the present invention have never been reported in the prior art.

Consequently, the objective of the present invention is to provide a new catalyst solid component for homo-polymerization or co-polymerization of ethylene, said catalyst having superior catalytic activity and hydrogen sensitivity, capable of producing polymers of high bulk density. More specifically, the objective of the present invention lies in providing a catalyst solid component for homo-polymerization or co-polymerization of ethylene, having a superior hydrogen sensitivity, wherein the form of the catalyst particles are controlled therein.

Another objective of the present invention is to provide a simple process for producing a catalyst for homo-polymerization or co-polymerization of ethylene.

Still other objectives and the utility of the present invention will become apparent as references are made with respect to the following descriptions and the claims thereto.

DETAILED DESCRIPTION OF THE PREFERRED EMBODIMENTS

The catalyst of superior catalytic activity and hydrogen sensitivity, capable of producing polymers having high bulk density as provided in the present invention, is produced by a simple yet efficient manufacturing process, which comprises (i) preparing a magnesium solution by contact-reacting a magnesium halide compound, with an alcohol, (ii) reacting the same with an ester compound containing at least one hydroxy group and a silicon compound containing an alkoxy group, and (iii) producing a solid titanium catalyst by adding a titanium compound and a silicon compound.

Types of magnesium halide compounds used in the present invention are as follows: magnesium dihalides such as magnesium chloride, magnesium iodide, magnesium fluoride, and magnesium bromide, alkylmagnesium halides such as methylmagnesium halide, ethylmagnesium halide, propylmagnesium halide, butylmagnesium halide, isobutyl-magnesium halide, hexylmagnesium halide, amylmagnesium halide; alkoxymagnesium halides such as methoxy-magnesiuum halide, ethoxymagnesium halide, isopropoxymagnesium halide, butoxymagnesium halide, octoxymagnesium halide: and aryloxymagnesium halides such as phenoxymagnesium halide and methylphenoxymagnesium halide. Of the above magnesium compounds, two or more compounds can be used in a mixture. Further, the above magnesium compounds can be effectively used in the form of a complex compound with other metals.

Of the compounds listed above, some can be represented by a simple formula, but the others cannot be su represented depending on the production methods of magnesium compounds. In the latter cases, it can be generally regarded as a mixture of some of the listed compounds. For example, the following compounds can be used in the present invention: such compounds obtained by reacting magnesium compounds with polysiloxane compounds, silane compounds containing halogen, ester, or alcohol; and such compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having an alkyl group of 1~10 carbons; alkoxymagnesium chlorides, preferably those having 1~10 carbons; and aryloxymagnesium chlorides, preferably those having 6~20 carbons. The magnesium solution used in the present invention is made by dissolving the aforementioned compounds with alcohol as a solvent in the presence or absence of a hydrocarbon solvent.

As to the types of hydrocarbon solvents used in the present invention, they include aliphatic hydrocarbons such as pentane, hexane, heptane, octane, decane, and kerosene: alicyclic hydrocarbons such as cyclopentane, methylcyclopentane, cyclohexane, and methylcyclohexane. aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a magnesium compound is converted into a magnesium solution, alcohol is used in the presence or absence of the aforementioned hydrocarbons. The types of alcohol include those containing 1~20 carbon atoms such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although alcohols containing 1~12 carbon atoms are preferable. The average size of a target catalyst and its particle distribution can vary according to the type of alcohol, the total contents, types of magnesium compounds, and the ratio of magnesium to alcohol, etc. Nevertheless, the total amount of alcohol required to obtain the magnesium solution is at least 0.5 mol per each mole of the magnesium compound, preferably about 1.0~20 mol. or more preferably about 2.0~10 mol.

The reaction of a magnesium compound with alcohol for producing magnesium solution is preferably carried out in the presence of hydrocarbon. The reaction temperature, while variable depending on the type and the amount of alcohol is at least −25° C., preferably −10~200° C., or more preferably about 0~150° C. It is preferable to carry out the reaction for about 15 minutes~5 hours, preferably for about 30 minutes~4 hours.

Of the electron donors used in the present invention, the ester compounds containing at least one hydroxy group include unsaturated aliphatic acid esters having at least one hydroxy group such as, 2-hydroxy ethylacrylate, 2-hydroxy ethylmethacrylate, 2-hydroxypropyl acrylate, 2-hydrolxypropylmethacrylate, 4-hydroxy butylacrylate, pentaerithritol triacrylate, aliphatic monoesters or polyesters containing at least one hydroxy group such as 2-hydroxy ethyl acetate, methyl 3-hydroxy butylate, ethyl 3-hydroxy butylate, methyl 2-hydroxy isobutylate, ethyl 2-hydroxy isobutylate, methyl 3-hydroxy-2-methyl propionate, 2.2-dimethyl-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, diethyl bis-(hydroxy methyl)malonate; aromatic esters having at least one hydroxy group such as 2-hydroxy ethyl benzoate, 2-hydroxy ethyl salicylate, methyl-4-(hydroxy methyl) benzoate, methyl-4-hydroxy benzoate, ethyl-3-hydroxy benzoate, 4-methyl salicylate, ethyl salicylate, phenyl salicylate, propyl-4-hydroxy benzoate, phenyl-3-hydroxy naphthanoate, monoethylene glycol monobenzoate, diethylene glycol benzoate, triethylene glycol benzoate; alicyclic esters having at least one hydroxy group such as lactone, and others. The amount of the ester compound containing at least one hydroxy group should be 0.001~5 mol per mole of magnesium, or preferably 0.01~2 mol per mole of magnesium.

For the silicon compound containing an alkoxy group, the other electron donor in the present invention, a compound having a general formula of $R^1_nSi(OR^2)_{4-n}$ (here, $R^1$ and $R^2$ represents a hydrocarbon having 1~12 carbons, and n for an integer of 0~3) is preferable. More specifically, it includes dimethyldimethoxy silane, dimethyldiethoxy silane, diphenyldimethoxy silane, methylphenyldimethoxy silane, diphenyidiethoxy silane, ethyltrimethoxy silane, vinyltrimethoxy silane, methyltrimethoxy silane, phenyltrimethoxy silane, methyltriethoxy silane, ethyltriethoxy silane, vinyltriethoxy silane, butyltriethoxy silane, phenyltriethoxy silane, ethyltriisopropoxy silane, vinyltributoxy silane, ethyl silicate, butyl silicate, methyltriaryloxy silane, etc. The amount of such compound should be 0.05~3 mol per mole of magnesium, or more preferably 0.1~2 mol per mole of magnesium.

As for the temperature for the contact-reaction of a magnesium solution, an ester compound containing at least one hydroxy group, and an alkoxy silicon compound, the temperature of 0~100° C. is appropriate, or more preferably 10~70° C.

In the process, the catalyst particles are recrystallized by reacting the magnesium compound solution with a mixture of a liquid titanium compound of a general formula of $Ti(OR)_aX_{4-a}$ (R-stands for an alkyl group with 1~10 carbons; X for a halogen atom; and "a" for a natural number of 0 to 4) and a silicon compound of a general formula of $R_nSiCl_{4-n}$ (here R stands for hydrogen: or an alkyl, alkoxy, haloalkyl, or aryl group having 1 to 10 carbons; or a halosilyl or halosilyl alkyl group having 1 to 8 carbons; n=0–3). The types of titanium compounds which satisfy the general formula of $Ti(OR)_aX_{4-a}$ include titanium tetrahalide such as $TiCl_4$, $TiBr_4$, and $TiI_4$; alkoxy titanium trihalide such as $Ti(OCH_3)Cl_3$, $Ti(OC_2H_5)Cl_3$, $Ti(OC_2H_5)Br_3$, and $Ti(O(i-C_4H_9)Br_3$; alkoxy titanium dihalide compounds such as $Ti(OCH_5)_2Cl_2$, $Ti(OC_2H_5)_2Cl_2$, $Ti(O(i-C_4H_9)_2Cl_2$, and $Ti(OC_2H_5)_2Br_2$: and tetra-alkoxy titaniums such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

The types of silicon compounds satisfying the above general formula of $R_nSiCl_{4-n}$ include silicon tetrachloride;

trichlorosilanes such as trichlorosilane, methyltrichlorosilane, ethyltrichlorosilane, phenyltrichlorosilane; dichlorosilanes such as dimethyldichlorosilane, diethyidichlorosilanc, di-phenyidichlorosilane, and methylphenyldichlorosilane; monochlorosilanes such as trimethylchlorosilane; and a mixture of these silicon compounds can also be used in the present invention, or more preferably silicon tetrachloride can be used.

The amount of the mixture of a titanium compound and a silicon compound used during the re-crystallization of the magnesium compound solution is appropriately 0.1~200 mol per mole of the magnesium halide compound, preferably 0.1~100 mol. or more preferably 0.2~80 mol. The molar ratio of a titanium compound to a silicon compound in the mixture is appropriately 0.05~0.95, or more preferably 0.1~0.8. When the magnesium compound solution is reacted with the mixture of a titanium compound and a silicon compound, the shape and the size of the resultant re-crystallized solid constituents vary a great deal according to the reaction conditions. In order to obtain the target size of the catalyst and the size and distribution of the polymers, as intended by the present invention, it is advantageous to maintain the above mixture amounts for said titanium and silicon compounds, as well as their mix ratios. If it is outside of the above range, it will be difficult to obtain the results as intended. The reaction of the magnesium compound with the mixture of a titanium compound and a silicon compound should be carried out preferably at a sufficiently low temperature to result in formation of solid constituents. More preferably, the reaction should be carried out by contact-reaction at $-70$~$70°$ C., or most preferably at $-50$~$50°$ C. After the contact-reaction the reacting temperature is slowly raised for sufficient reaction for the duration of 0.5~5 hours at 50~150° C.

The particles of the solid catalysts obtained during the above process can be further reacted with titanium compounds. These titanium compounds are titanium halides, and alkoxy titanium halide with an alkoxy functional group of 1~20 carbons. At times, a mixture of these compounds can also be used. Of these compounds, however, titanium halide and an alkoxy titanium halide compound having an alkoxy functional group of 1~8 carbons can be appropriately used, or more preferably titanium tetrahalide can be used.

Further, the solid complex titanium catalysts produced during the process of the present invention can be utilized during homopolymerization or co-polymerization of ethylene. In particular, the catalyst is used in homo-polymerization of ethylene, and also in co-polymerization of ethylene and α-olefin such as propylene, 1-butene, 1-pentene, 1-methyl-1-pentene, or 1-hexene having three or more carbons.

The polymerization reaction in the presence of the catalyst of the present invention is carried out by means of using (i) a solid complex titanium catalyst of the present invention, comprising magnesium, titanium, halogen, and electron donors, and (ii) a cocatalyst comprising, compounds of organic metals of Groups II and III of the Periodic Table.

The solid complex titanium catalyst constituents of the present invention can be used in pre-polymerization of ethylene or α-olefin prior to the use in the aforementioned polymerization reaction. The pre-polymerization can be carried out in the presence of a hydrocarbon solvent such as hexane, at a sufficiently low temperature, with ethylene or α-olefin under pressure, in the presence of the above catalyst constituents and such an organic aluminum compound as triethylaluminum. Pre-polymerization, by maintaining the shape of the catalyst by surrounding the catalyst particle s with polymers, is helpful in producing food-quality post-polymerization shape of the polymers. The weight ratio of the polymers to the catalysts after pre-polymerization is ordinarily 0.1:1 to 20:1.

The organometallic compound in the present invention can be represented by a general formula of $MR_n$, wherein, M stands for a metal constituent of Group II or IIIA in the Periodic Table, such as magnesium, calcium, zinc, boron, aluminum, and gallium, R for an alkyl group with 1~20 carbons, such as a methyl, ethyl, butyl, hexyl, octyl, or decyl group, and n for the atomic value of the metal constituent. As for more preferable organometallic compounds. trialkyl aluminum having an alkyl group of 1~6 carbons, such as triethylaluminum and triisobutylaluminum, or the mixture thereof can be utilized. On occasions, an organic aluminum compound having one or more halogen or hydride groups, such as ethylaluminum dichloride, diethylaluminum chloride, ethyl-aluminum sesqui-chloride, or diisobutylaluminum hydride can also be used.

As for the polymerization reaction, it is possible to carry out either gas phase or bulk polymerization in the absence of an organic solvent, or liquid slurry polymerization in the presence of an organic solvent. These polymerization methods, however, are carried out in the absence of oxygen, water, or other compounds that may act as catalytic poison.

The concentration of the solid complex titanium compound (i) with respect to the polymerization system, in the case of a liquid phase slurry polymerization, is approximately 0.001~5 mmol in terms of the titanium atom of the catalyst per one liter of the solvent, or more preferably approximately 0.001~0.5 mmol. As for the solvent, the following compounds or the mixtures thereof can be used: alkanes or cycloalkanes such as pentane, hexane, heptane, n-octane, isooctane, cyclohexane, or methylcyclohexane: alkylaromatic such as toluene, xylene, ethylbenzene, isopropylbenzene, ethyltoluene, n-propylbenzene, or diethylbenzene; and halogenated aromatics such as chlorobenzene, chloronaphthalene, or ortho-dichlorobenzene.

In the case of gas phase polymerization, the amount of the solid complex titanium catalyst (i) should be approximately 0.001~5 mmol in terns of the titanium atom of the catalyst per one liter of the polymerization reactant, preferably approximately 0.001~1.0 mmol, or more preferably approximately 0.01~0.5 mmol.

The preferable concentration of the organometallic compound (ii) is about 1~2000 mol, as calculated by the aluminum atoms, per mole of the titanium atoms in the catalyst (i), or more preferably about 5~500 mol.

To secure a high reaction rate of polymerization, the polymerization herein is carried out at a sufficiently high temperature, regardless of the polymerization manufacturing process. Generally, the temperature of approximately 20~200° C. is appropriate, or more preferably approximately 20~95° C. The appropriate pressure of monomers at the time of polymerization is the atmospheric to 100 atm, or more preferably 2~50 atm.

In the present invention, in order to evaluate the hydrogen reactivity of the catalyst, the changes in the molecular weight according to the amount of hydrogen at the time of polymerization are shown as a melt index (ASTM D 1238), the index generally known in the art. The value of the melt index generally becomes greater as the molecular weight decreases.

The products obtained by the method of polymerization of the present invention are solid ethylene homogeneous polymers or the copolymers of ethylene and α-olefin, which have excellent bulk density and fluidity. Since the polymer yields are sufficiently high, there is no need for the removal of the catalyst residues.

The present invention is further described by means of the examples and comparative examples as below but should not be confined or limited to these examples.

EXAMPLE 1

Production of Catalyst

A Solid Complex Titanium Catalyst Was Produced by Means of the Following Three Steps:

(i) Step: Production of Magnesium Solution

Into a 1.0L reactor equipped with a mechanical stirrer, replaced with nitrogen atmosphere, 9.5 g of $MgCl_2$ and 400 ml of decane were placed therein. After they were stirred at 300 rpm, 60 ml of 2-ethyl hexanol was added thereto. The temperature was raised to 120° C. and then the reaction was allowed to continue for three hours. The homogenous solution, which was obtained after the reaction, was cooled to room temperature (25° C.).

(ii) Step: Contact-Reaction of a Magnesium Solution, an Ester Containing a Hydroxy Group and an Alkoxy Boron Compound To the magnesium solution, cooled to room temperature as above, 1.2 ml of 2-hydroxyethyl methacrylate and 10 ml (45 mmol) of silicon tetraethoxide were added, and then the reaction was allowed to continue for an hour. (iii) Step: Treatment of a Mixture of a Titanium Compound and a Silicon Compound After cooling the above solution to room temperature (25° C.), a solution mixture of 30 ml of titanium tetrachloride and 30 ml of silicon tetrachloride was dripped into the above solution for one hour. After the completion of the dripping process, the temperature of the reactor was raised to 90° C. while stirring, after which was maintained at that temperature for one hour. After stopping the stirring, the supernatant of the solution was removed, and to the remaining solid layer was added 300 ml of decane and 100 ml of titanium tetrachloride in sequence. There, the temperature was raised to 100° C. and maintained thereat for two hours. After the reaction, the reactor was cooled to room temperature and the washing of the resulting solid product with 400 ml of hexane was repeated until the removal of free unreacted titanium chloride. The titanium content of the solid catalyst so produced was 3.6%.

Polymerization

A 2-L high-pressure reactor was dried in an oven and assembled while still hot. In order to make the inside of the reactor nitrogen atmosphere, nitrogen and vacuum were alternatively manipulated three times in the reactor. To the reactor was added 1.000 ml of n-hexane. after which 2 mmols of triethylaluminum and a solid catalyst by 0.03 mmol in terms of the titanium atoms were added thereto. Then, 2000 ml of hydrogen was added. The temperature was raised to 80° C. while stirring at 700 rpm. The pressure of ethylene was adjusted to 80 psi, and the polymerization was allowed to continue for an hour. After the polymerization, the temperature of the reactor was lowered to room temperature, and a large amount of ethanol was added to stop the polymerization. The polymer thus produced was collected by separation and was dried in an oven at 50° C. for at least six hours. whereby polyethylene was obtained in the form of white powder.

The polymerization activity (kg of polyethylene divided by mmol of Ti) was calculated as the weight (kg) ratio of the polymer as produced per the amount of the catalysts so used (mmol of Ti). The results of the polymerization are shown in Table 1, together with the bulk density (g/ml) of the polymers and the melt index (g/10 minutes).

EXAMPLE 2

The catalyst was prepared the same as in Example 1, except that in Step (ii) of Example 1, the temperature of the magnesium solution was adjusted to room temperature (25° C.). The titanium content of the catalyst thus produced was 3.2%. The polymerization was carried out as in Example 1, and the results thereof are shown in Table 1.

EXAMPLE 3

The catalyst was prepared the same as in Example 2, except that in Step (ii) of Example 2, 2.4 ml of 2-hydroxyethyl methacrylate and 10.0 ml of silicon tetraethoxide were used. The titanium content of the catalyst thus produced was 2.9%. The polymerization was carried out as in Example 1, and the results thereof are shown in Table 1.

EXAMPLE 4

The catalyst was prepared the same as in Example 2, except that in Step (ii) of Example 2, 3.6 ml of 2-hydroxyethyl methacrylate and 10.0 ml of silicon tetraethoxide were used. The titanium content of the catalyst thus produced was 2.5%. The polymerization was carried out as in Example 1, and the results thereof are shown in Table 1.

EXAMPLE 5

The catalyst was prepared the same as in Example 2, except that in Step (ii) of Example 2, 1.2 ml of 2-hydroxyethyl methacrylate and 5.0 ml of silicon tetraethoxide were used for the production of the catalyst. The titanium content of the catalyst thus produced was 3.5%. The polymerization was carried out as in Example 1, and the results thereof are shown in Table 1.

EXAMPLE 6

The catalyst was prepared the same as in Example 2, except that in Step (ii) of Example 2, 1.2 ml of 2-hydroxyethyl methacrylate and 15.0 ml of silicon tetraethoxide were used for the production of the catalyst. The titanium content of the catalyst thus produced was 3.1%. The polymerization was carried out as in Example 1, and the results thereof are shown in Table 1.

EXAMPLE 7

The catalyst was prepared the same as in Example 2, except that in Step (iii) of Example 2, 30 ml of titanium tetrachloride and 30 ml of silicon tetrachloride were dripped in the period of 30 minutes for production of the catalyst. The titanium content of the catalyst thus produced was 3.8%. The polymerization was carried out as in Example 1, and the results thereof are shown in Table 1.

EXAMPLE 8

The catalyst was prepared the same as in Example 2, except that in Step (iii) of Example 2, 30 ml of titanium tetrachloride and 30 ml of silicon tetrachloride were dripped in the period of 2 hours for production of the catalyst. The titanium content of the catalyst thus produced was 3.6%. The polymerization was carried out as in Example 1, and the results thereof are shown in Table 1.

EXAMPLE 9

The polymerization was carried out using the catalyst produced in Example 1 and 1500 ml of hydrogen, and the results thereof are shown in Table 1.

EXAMPLE 10

The polymerization was carried out using the catalyst produced in Example 1 and 1000 ml of hydrogen, and the results thereof are shown in Table 1.

EXAMPLE 11

The catalyst was prepared the same as in Example 2, except that in Step (i) of Example 2, 400 ml of decane was used in the production of the magnesium solution. The titanium content of the catalyst thus produced was 3.6%. The polymerization was carried out as in Example 1, and the results thereof are shown in Table 1.

EXAMPLE 12

The catalyst was prepared the same as in Example 11, except that in Step (iii) of Example 11, 40 ml of titanium tetrachloride and 20 ml of silicon tetrachloride were used. The titanium content of the catalyst thus produced was 3.8%. The polymerization was carried out as in Example 1, and the results thereof are shown in Table 1.

EXAMPLE 13

The catalyst was prepared the same as in Example 12, except that in Step (iii) of Example 12, 20 ml of titanium tetrachloride and 40 ml of silicon tetrachloride were used. The titanium content of the catalyst thus produced was 3.4%. The polymerization was carried out as in Example 1, and the results thereof are shown in Table 1.

EXAMPLE 14

The catalyst was prepared the same as in Example 2, except that in Step (iii) of Example 2, 40 ml of titanium tetrachloride and 20 ml of silicon tetrachloride were used. The titanium content of the catalyst thus produced was 3.9%. The polymerization was carried out as in Example 1, and the results thereof are shown in Table 1.

EXAMPLE 15

The catalyst was prepared the same as in Example 2, except that in Step (iii) of Example 2, 20 ml of titanium tetrachloride and 40 ml of silicon tetrachloride were used. The titanium content of the catalyst thus produced was 3.5%. The polymerization was carried out as in Example 1, and the results thereof are shown in Table 1.

COMPARATIVE EXAMPLE 1

The catalyst was prepared the same as in Example 2, except that in Step (ii,) of Example 2, 10.0 ml of silicon tetraethoxide was added and 2-hydroxyethyl methacrylate was not used. The titanium content of the catalyst thus produced was 3.8%. The polymerization was carried out us in Example 1, and the results thereof are shown in Table 1.

COMPARATIVE EXAMPLE 2

The catalyst was prepared the same as in Example 2, except that in Step (ii) of Example 2, 1.2 ml of 2-hydroxyethyl methacrylate was added and silicon tetraethoxide was not used. The titanium content of the catalyst thus produced was 3.4%. The polymerization was carried out as in Example 1, and the results thereof are shown in Table 1.

COMPARATIVE EXAMPLE 3

The catalyst was prepared the same as in Example 2, except that in Step (ii) of Example 2, neither 2-hydroxyethyl methacrylate nor silicon tetraethoxide was used. The titanium content of the catalyst thus produced was 4.3%. The polymerization was carried out as in Example 1, and the results thereof are shown in Table 1.

COMPARATIVE EXAMPLE 4

The catalyst was prepared the same as in Example 2, except that in Step (iii) of Example 2, 60 ml of titanium tetrachloride was used. The titanium content of the catalyst thus produced was 4.4%. The polymerization was carried out as in Example 1, and the results thereof are shown in Table 1.

COMPARATIVE EXAMPLE 5

The polymerization was carried out using the catalyst produced in Comparative Example 4 and 1500 ml of hydrogen. The results thereof are shown in Table 1.

COMPARATIVE EXAMPLE 6

The polymerization was carried out using the catalyst produced in Comparative Example 4 and 1000 ml of hydrogen. The results thereof are shown in Table 1.

COMPARATIVE EXAMPLE 7

The catalyst was prepared the same as in Example 2, except that in Step (ii) of Example 2, neither 2-hydroxyethyl methacrylate nor silicon tetraethoxide was used, and in Step (iii) 60 ml of titanium tetrachloride was used. The titanium content of the catalyst thus produced was 4.1%. The polymerization was carried out as in Example 1, and the results thereof are shown in Table 1.

TABLE 1

Results of Polymerization

| Example | Amount of Hydrogen (ml) | Activity (kg PE/mmol Ti) | Bulk Density (g/ml) | Melting Index (g/10 min) |
|---|---|---|---|---|
| 1 | 2.000 | 2.3 | 0.36 | 38.9 |
| 2 | 2.000 | 2.1 | 0.35 | 35.2 |
| 3 | 2.000 | 2.5 | 0.34 | 38.4 |
| 4 | 2.000 | 2.3 | 0.33 | 39.2 |
| 5 | 2.000 | 2.6 | 0.34 | 33.1 |
| 6 | 2.000 | 2.0 | 0.36 | 32.4 |
| 7 | 2.000 | 2.7 | 0.32 | 38.1 |
| 8 | 2.000 | 2.1 | 0.35 | 34.8 |
| 9 | 1.500 | 2.8 | 0.34 | 19.8 |
| 10 | 1.000 | 3.9 | 0.32 | 3.8 |
| 11 | 2.000 | 2.2 | 0.34 | 36.4 |
| 12 | 2.000 | 2.4 | 0.35 | 31.7 |
| 13 | 2.000 | 2.0 | 0.33 | 34.8 |
| 14 | 2.000 | 2.6 | 0.36 | 38.9 |
| 15 | 2.000 | 2.4 | 0.35 | 36.8 |
| CE1 | 2.000 | 1.4 | 0.35 | 12.4 |
| CE2 | 2.000 | 1.6 | 0.32 | 22.6 |
| CE3 | 2.000 | 1.2 | 0.28 | 8.2 |
| CE4 | 2.000 | 2.2 | 0.32 | 18.1 |
| CE5 | 1.500 | 2.9 | 0.32 | 7.8 |
| CE6 | 1.000 | 3.6 | 0.31 | 2.7 |
| CE7 | 2.000 | 1.1 | 0.22 | 7.8 |

*CE: Comparative Examples

As shown above, the production process of the catalyst of the present invention for homo-polymerization and co-polymerization of ethylene is simple with excellent catalytic activity. Further, with the catalyst particles being controlled, high bulk density of the polymer can be provided, and the hydrogen sensitivity is greatly improved.

What is claimed is:

1. A method for producing a solid titanium catalyst for homo-polymerization and co-polymerization of ethylene, comprising:

preparing a magnesium compound solution by contacting a magnesium halide compound with an alcohol;

preparing a second solution by reacting the magnesium compound solution with an ester compound comprising at least one hydroxy group and a first silicon compound, wherein the first silicon compound comprises a silicon compound having an alkoxy group; and reacting the second solution with a mixture of a titanium compound and a second silicon compound to produce the solid titanium catalyst, the second silicon compound comprising a silicon halide.

2. The method for producing a solid titanium catalyst of claim 1, wherein the produced solid titanium catalyst is further reacted with a second titanium compound.

3. The method for producing a solid titanium catalyst of claim 1, wherein the ester compound comprises an unsaturated aliphatic ester having at least one hydroxy group.

4. The method for producing a solid titanium catalyst of claim 1, wherein the ester compound comprises 2-hydroxy ethylacrylate, 2-hydroxy ethylmethacrylate, 2-hydroxy propyl acrylate, 2-hydroxy propylmethacrylate, 4-hydroxy butylacrylate, or pentaerithritol triacrylate.

5. The method for producing a solid titanium catalyst of claim 1, wherein the ester compound comprises an aliphatic monoester having at least one hydroxy group or an aliphatic polyester having at least one hydroxy group.

6. The method for producing a solid titanium catalyst of claim 1, wherein the ester compound comprises 2-hydroxy ethyl acetate, methyl 3-hydroxy butylate, ethyl 3-hydroxy butylate, methyl 2-hydroxy isobutylate, ethyl 2-hydroxy isobutylate, methyl 3-hydroxy -2-methyl propionate, 2,2-dimethyl-3-hydroxy propionate, ethyl-6-hydroxy hexanoate, t-butyl -2-hydroxy isobutylate, diethyl-3-hydroxy glutarate, ethyllactate, isopropyl lactate, butyl-isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, or diethyl bis-(hydroxymethyl) malonate.

7. The method for producing a solid titanium catalyst of claim 1, wherein the ester compound comprises an aromatic ester having at least one hydroxy group.

8. The method for producing a solid titanium catalyst of claim 1, wherein the ester compound comprises 2-hydroxy ethyl benzoate, 2-hydroxy ethyl salicylate, methyl4-(hydroxy methyl) benzoate, methyl-4-hydroxy benzoate, ethyl-3-hydroxy benzoate, 4-methyl salicylate, ethyl salicylate, phenyl salicylate, propyl-4-hydroxy benzoate, phenyl-3-hydroxy naphthanoate, monoethylene glycol monobenzoate, diethylene glycol benzoate, or triethylene glycol monobenzoate.

9. The method for producing a solid titanium catalyst of claim 1, wherein the ester compound comprises an alicyclic ester having at least one hydroxy group.

10. The method for producing a solid titanium catalyst of claim 1, wherein the first silicon compound comprises the general formula $R^1_n Si(OR^2)_{4-n}$, wherein $R^1$ comprises a hydrocarbon having between 1 to 12 carbons, wherein $R^2$ comprises a hydrocarbon having between 1 to 12 carbons, and wherein n comprises an integer between 0 and 3.

11. The method for producing a solid titanium catalyst of claim 1, wherein the first silicon compound comprises dimethyldimethoxy silane, dimethyldiethoxy silane, diphenyldimethoxy silane, methylphenyldimethoxy silane, diphenyldiethoxy silane, ethyltrimethoxy silane, vinyltrimethoxy silane, methyltrimethoxy silane, phenyltrimethoxy silane, methyltriethoxy silane, ethyltriethoxy silane, vinyltriethoxy silane, butyltriethoxy silane, phenyltriethoxy silane, ethyltriisopropoxy silane, vinyltributoxy silane, ethylsilicate, butylsilicate, or methyltriaryloxy silane.

12. The method for producing a solid titanium catalyst of claim 1, wherein the titanium compound comprises the general formula $Ti(OR)_a X_{4-a}$, wherein R comprises an alkyl group with 1 to 20 carbon atoms, wherein X comprises a halogen atom, and wherein a comprises an integer between 0 and 4.

13. The method for producing a solid titanium catalyst of claim 1, wherein the titanium compound comprises a titanium tetrahalide, wherein the titanium tetrahalide comprises $TiCl_4$, $TiBr_4$, or $TiI_4$.

14. The method for producing a solid titanium catalyst of claim 1, wherein the titanium compound comprises an alkoxy-titanium trihalide, wherein the alkoxy-titanium trihalide comprises $Ti(OCH_3)Cl_3$, $Ti(OC_2H_5)Cl_3$, $Ti(OC_2H_5)Br_3$, or $Ti(O(i-C_4H_9))Br_3$.

15. The method for producing a solid titanium catalyst of claim 1, wherein the titanium compound comprises an alkoxy-titanium dihalide, wherein the alkoxy-titanium dihalide comprises $Ti(OCH_3)_2Cl_2$, $Ti(OC_2H_5)_2Cl_2$, $Ti(OC_2H_5)_2Br_2$, or $Ti(O(i-C_4H_9))_2Cl_2$.

16. The method for producing a solid titanium catalyst of claim 1, wherein the titanium compound comprises a tetraalkoxy-titanium compound, wherein the tetraalkoxy-titanium compound comprises $Ti(OCH_3)_4$, $Ti(OC_2H_5)_4$, or $Ti(OC_4H_9)_4$.

17. The method for producing a solid titanium catalyst of claim 1, wherein the second silicon compound comprises the general formula $R_n SiCl_{4-n}$, wherein R comprises hydrogen, or R comprises an alkyl group, an alkoxy group, a haloalkyl group, or an aryl group having 1 to 10 carbon atoms, or R comprises a halosilyl group or a halosilyl alkyl group having 1 to 8 carbon atoms, and wherein n comprises an integer between 0 and 4.

18. The method for producing a solid titanium catalyst of claim 1, wherein the second silicon compound comprises silicon tetrachloride.

19. The method for producing a solid titanium catalyst of claim 1, wherein the second silicon compound comprises a trichlorosilane, wherein the trichlorosilane comprises methyltrichlorosilane, ethyltrichlorosilane, or phenyltrichlorosilane.

20. The method for producing a solid titanium catalyst of claim 1, wherein the second silicon compound comprises a dichlorosilane, wherein the dichlorosilane comprises dimethyldichlorosilane, diethyldichlorosilane, diphenyldichlorosilane, or methylphenyldichlorosilane.

21. The method for producing a solid titanium catalyst of claim 1, wherein the second silicon compound comprises trimethylchlorosilane.

22. The method for producing a solid titanium catalyst of claim 1, wherein the ester compound comprises 2-hydroxyethyl methacrylate, wherein the first silicon compound comprises silicon tetraethoxide, wherein the titanium compound comprises titanium tetrachloride, and wherein the second silicon compound comprises silicon tetrachloride.

23. The method of producing a solid titanium catalyst of claim 1, wherein an amount of the mixture of the titanium compound and the second silicon compound is about 0.1 moles per mole of the magnesium halide compound to about 200 moles per mole of the magnesium halide compound, and wherein a molar ratio of the titanium compound to the second silicon compound in the mixture is between about 0.05 and about 0.95.

* * * * *